United States Patent [19]

Fujihara, deceased et al.

[11] Patent Number: 4,547,399

[45] Date of Patent: Oct. 15, 1985

[54] SEALING COMPOSITION AND METHOD OF MAKING THE SAME

[75] Inventors: Yoshiki Fujihara, deceased, late of Carpenterville, Ill.; by Hiroko Fujihara, heiress, Burnsville, Minn.; John J. Sackis, Bartlett; Richard A. Frier, Arlington Heights, both of Ill.

[73] Assignee: W. R. Meadows, Inc., Elgin, Ill.

[21] Appl. No.: 620,513

[22] Filed: Jun. 14, 1984

Related U.S. Application Data

[63] Continuation-in-part of Ser. No. 478,811, Mar. 28, 1983, abandoned, which is a continuation of Ser. No. 259,818, May 4, 1981, abandoned.

[51] Int. Cl.$^4$ .............. B22B 35/00; C08L 9/06; C08L 95/00; E01C 5/12
[52] U.S. Cl. .................. 427/138; 427/140; 524/62; 524/425; 524/474
[58] Field of Search ............... 524/62, 474, 484, 425; 427/138, 140

[56] References Cited

U.S. PATENT DOCUMENTS

| | | | |
|---|---|---|---|
| 4,068,023 | 1/1978 | Nielson et al. | 524/69 |
| 4,129,542 | 12/1978 | Matheson et al. | |
| 4,242,246 | 12/1980 | Maldonado et al. | |
| 4,250,067 | 2/1981 | Bresson | |
| 4,278,469 | 7/1981 | Yan et al. | 524/62 |

*Primary Examiner*—Allan M. Lieberman
*Attorney, Agent, or Firm*—H. B. Van Valkenburgh; Jerry W. Berkstresser

[57] ABSTRACT

Composition produced from paving grade asphalt, process oil (not over 32%) and SBR rubber or rubbers, such as butadiene-styrene copolymers, in decreasing amounts by weight. A preferred range is asphalt 41.9–61.25%, process oil 18–25%, lower molecular weight butadiene-styrene copolymer 8–17%, higher molecular weight butadiene-styrene copolymer 2–4% and filler, such as limestone dust, 0–20%. Other preferred formulae are shown, as well as temperature and other conditions of the preferred method, including reheating of composition for application to joints, cracks and the like.

19 Claims, No Drawings

SEALING COMPOSITION AND METHOD OF MAKING THE SAME

This application is a continuation-in-part of Ser. No. 478,811 filed Mar. 28, 1983, which is in turn a continuation of Ser. No. 259,818 filed May 4, 1981 and both now abandoned.

This invention relates to sealing composition for joints and cracks in asphalt and concrete, particularly streets and highways.

BACKGROUND OF THE INVENTION

The effective sealing of cracks and joints in asphalt and concrete streets and highways has, for years, been a requisite of effective maintenance. For initial construction, as in sealing the space above a joint filler placed between two blocks of or between an asphalt and a concrete layer, a "hot pour" sealer is desirable, i.e. one which is supplied in solid form but may be melted at a reasonable temperature and poured into the joint for solidification. A "hot pour" sealer is generally preferable to permit a high degree of bonding of the sealer to the asphalt or concrete surfaces of the joint, with a better penetration of irregularities or small depressions in the surface to be bonded. Such a sealer is also desirable for filling cracks which have developed in concrete or asphalt pavement through traffic stresses, temperature changes and the like, to prevent widening of a crack, as by spalling, with the production of a larger crack, a pothole or the like.

The primary purposes of crack sealing are to prevent the entry of water into the substrate bases or subgrade soils, which would cause softening and loss of bearing power, swelling, frost heave or shrinking, mud pumping, and similar consequences. A desirable property of a sealer is to prevent entry of gravel, rock or other detritus which might restrain the normal narrowing of a joint upon expansion of the asphalt or concrete during warmer or hot weather.

Federal Specification SS-S-164 dated Feb. 12, 1952 for "Sealer, Hot-Poured Typed, for Joints in Concrete" superseded Federal Specification SS-F-336a dated May 19, 1947, and covered joint sealers for use in sealing joints in concrete pavements, bridges and other structures. It became evident that such hot pour joint sealers could also be used to seal cracks and such use became prevalent. Compositions, including rubber or both rubber and asphalt, have been sold for this purpose for many years. Thus a SEALZ hot poured joint sealer was advertised in 1945 by Dispersions Process, Inc. of New York, N.Y. but manufactured at Nagautuck, Conn. under the management of U.S. Rubber Co. The product is stated to have been accepted since 1938, to comply with Federal Specification SS-F-336a, and to contain a specially prepared rubber, natural and synthetic resins and expanded pigments.

W. R. Meadows, Inc. of Elgin, Ill., advertised in 1960 a "Sealtight" hot pour rubber asphalt joint sealer manufactured and sold by it and stated to meet Federal Specification SS-S-164. The sale and use thereof have continued to this date, including the sale thereof since 1962 as "Sealtight 164." This hot pour sealer for many years comprised paving grade asphalt in excess of 50%, a substantial amount of ground scrap rubber, a lesser amount of filler and a minor amount of process oil. In more recent years, the amount of ground scrap rubber has been reduced and an SBR rubber has been substituted for a substantial portion of the scrap rubber. Also more recently, a variation of "Sealtight 164", sold as "Sealtight Hi-Spec", comprised paving grade asphalt in excess of 50%, a substantial amount of filler and lesser amounts of SBR rubber and process oil. This composition exhibited an improvement over "Sealtight 164" in the bond and resiliency, as well as better low temperatures properties. Due to the presence of both process oil and SBR rubber, these compositions appear to be relevant to the present invention, although none have exhibited the properties of the compositions of this invention, as will be pointed out later.

A series of U.S. patents have been issued, e.g. U.S. Pat. Nos. 3,844,668; 3,891,585; 3,919,148; 3,939,100; 4,018,730; 4,021,393; 4,069,182; 4,085,078; 4,113,401; and 4,137,204; each disclosing pavement repair material formed by the reaction of paving grade asphalt and a non-oil resistant rubber, in some with addition of ingredients, such as a diluent to reduce viscosity, an asphalt rubber soap or an asphalt solvent. In all of the above, the asphalt and rubber are heated to temperatures which may be as high as 500° F. specifically to form a gel. Particularly, U.S. Pat. No. 4,021,393 discloses a method and composition for surfacing and repairing broken pavements with an elastomeric material having improved flexing properties at freezing temperatures without any significant loss of viscosity at high application temperatures, this material comprising the reaction product between paving grade asphalt and non-oil resistant rubber to which 3 to 20 percent of a malthene has been admixed. A malthene is defined as the oily or soft constituent of bitumen which is soluble in petroleum spirits. Prior to this invention, the best low temperature properties of a joint sealer have been those of an expensive silicone rubber material.

In U.S. Pat. No. 4,278,469, it is stated that a binder composition for repairing and surfacing broken asphalt pavements may be made by blending a highly aromatic fluidized catalytic cracking (FCC) main column bottoms or equivalent, such as thermofor catalytic cracking (TCC) bottoms and an asphalt soluble elastomer, such as a polymer, with natural and synthetic rubbers being particularly desirable, in an amount of 1 to 20 percent of the total weight of the binder. Of the two specific examples provided, the first involves FCC main column bottoms and ethylene-vinyl acetate constituting 20% of the total weight. This binder is heated and spread over a fatigued asphalt pavement. The other example involves a heated asphalt residuum of high paraffinic content to which is added ground tire rubber and TCC syntower bottoms equivalent in hydrogen content to the FCC bottoms of the first example. The proportions by weight are 40/50/10 of asphalt to TCC syntowner bottoms to scrap rubber. A sample of FCC bottoms was tested to ascertain whether it could be substituted for the process oil used in the present invention and the specific proportions of the preferred embodiments were utilized, i.e. the proportions of Example 1 and Example 2 hereinafter set forth, as well as the preferred heating, mixing and other conditions. The resulting product was subjected to the same tests as the products of this invention. It was found that FCC bottoms failed to produce a suitable product. Thus, each product produced by using FCC bottoms failed the 300% expansion test at $-20°$ F., although passing the 100% expansion test for 3 cycles at $-20°$ F. In addition, each product produced using FCC bottoms was unsatisfactory through susceptibility to heat, having too high a flow value when heated to 140° F. for five hours with the sample placed at a 75° angle, in a standard ASTM test.

Among the objects of this invention are to provide a new and improved composition for crack and joint sealing purposes, particularly for concrete or asphalt pavements, highways and the like; to provide such a composition which has improved adhesion and particularly an improved adhesion and maintenance of this adhesion at low temperatures; to provide such a composition which produces less stress on the interface bond between the sealer and the concrete or asphalt, particularly during contraction at low temperatures; to provide such a composition which will tend to limit the entry of gravel, rock and similar detrius; to provide such a composition which may be transported as a solid and heated to a reasonable temperature for application; to provide such a composition which is a visibly homogenous composition and free of any settling components when heated to a safe temperature; to provide such a composition which, when melted, has a uniform pouring consistency and will completely fill joints or cracks without the inclusion of large air holes or discontinuities; to provide such a composition which, at −20° F. or −29° C., can be extended at least three cycles, for 100% of its original width without rupture, as well as at least one cycle for 300% of its original width without rupture; to provide a novel method of making such a composition reliably and effectively; and to provide such a method which is readily carried out.

SUMMARY OF THE INVENTION

The composition of this invention is produced from paving grade asphalt, operative process oil and SBR rubber with the weight of the paving grade asphalt being in excess of the weight of the process oil and the latter weight in excess of the weight of the SBR rubber. Whenever process oil is referred to herein, in connection with the invention, the term is to be construed as meaning operative process oil, which is defined as a generally naphthenic, aliphatic or naphthenic-aliphatic oil containing less aromatic compounds than would cause said composition to fail the heat and cold tests applied thereto and less aromatic compounds than the products of catalytic cracking known as FCC or TCC bottoms or known as slurry oil. Minor amounts of other ingredients may be used as modifiers, blending aids or fillers, such as sulfur and/or limestone. A first embodiment may have the following ingredients, in the percentages by weight of Table I below.

TABLE I

| Ingredient | Percentage |
| --- | --- |
| AC-5 asphalt | 38–47% |
| Operative process oil | 29–32% |
| SBR rubber | 23–30% |
| Sulfur | 0.3% |

Preferably all the asphalt, but at least 50% thereof and preferably preheated, may be placed in an enclosed mixing vat and heat is supplied, as by heating oil in a jacket, to maintain a temperature at or above which the SBR rubber is dispersable, such as 275° to 300° F. or 140° to 149° C., with a portion of the process oil, such as 30% to 70% and preferably 50%, being added and the ground SBR rubber added by increments while the mixture is stirred for a desired period. The remainder of the asphalt may be added in increments or at the end of the above period, when not all of the asphalt is used initially. Then, the remainder of the process oil and the sulfur are added and stirring continued while the heat is maintained until the mixture appears to be smooth, i.e. until a smooth, essentially homogenous mixture is obtained. The composition may be packed in pails and stored, then later reheated, as to 390° to 400° F., for several hours preparatory to application to clean joints, cracks and the like. The composition of this embodiment should be heated to such a temperature for less than 6 hours, since it exhibits a tendency to become stringy and suddenly increase in viscosity, when heated for 6 hours or more at such a temperature.

A second embodiment of this invention may have the following ingredients in the percentages by weight of Table II below, it being noted that, in each embodiment, the operative process oil does not exceed 32% by weight of the total weight.

TABLE II

| Ingredient | Percentage |
| --- | --- |
| AC-5 asphalt | 41.9–61.25% |
| Operative process oil | 18–25% |
| SBR rubber (higher molecular weight) | 2–4% |
| SBR rubber (lower molecular weight) | 8–17% |
| Limestone filler | 0–20% |

Asphalt preheated to a temperature at or above that at which SBR rubber of higher molecular weight is dispersable, such as 350°–375° F., may be placed in a jacketed, enclosed mixing vat and the higher molecular weight SBR rubber, which is preferably ground to be more finely divided than the SBR rubber of lower molecular weight, is added in increments. Less than all of the asphalt may be used, but sufficient in amount that the butadiene-styrene copolymer is dispersable. Since the copolymer of greater molecular weight requires a higher temperature to be dispersable, a minimum amount of process oil is desirable in order to reduce cooling of the asphalt during stirring. The mixture is stirred, while heat is supplied to the vat to maintain a temperature, such as 325° to 350° F., at which the copolymer is dispersable. After the mixture has become smooth, such as after one hour, a portion of the process oil is added, such as between 30% and 70% but preferably one-half. Then, the ground butadiene-styrene copolymer of lower molecular weight is added in increments. Stirring is continued for a period, such as one hour, until the size of the lumps or particles decreases visbily, while the temperature is maintained at a temperature, such as above 275° F., at which the butadiene-styrene copolymer of lower molecular weight is dispersable.

Then the remainder of the process oil and the filler are added and stirring is continued, as for a period of about two hours, until the mixture becomes smooth. As before, the composition may be packed in pails or other containers, for reheating prior to application to clean joints, cracks, and the like.

DESCRIPTION OF THE PREFERRED EMBODIMENTS

Reference is made to Table I for the ingredients and range of percentages of the first embodiment. Of the ingredients of Table I, the AC-5 asphalt is a paving grade asphalt meeting ASTM specification D-3381. A penetration grade 120-150 asphalt is an equivalent grade of asphalt which may be used. The preferred operative process oil is SUS 200 naphthenic oil having a Saybolt Universal viscosity of 200 to 215 at 100° F. and 42-44 at 210° F., an API gravity of 21.0 to 24.0, a minimum flash point of 340° F. and a maximum pour point of −20° F. The preferred SBR rubber is a butadiene-styrene copolymer having a butadiene to styrene ratio of 75 to 25, such as corresponding to the copolymer of lesser molecular weight utilized in the second embodiment. The copolymer is preferably a non-staining solution-polymerized block available in bale and crumb form and having a specific gravity of about 0.93 and a molecular weight of 83M. The sulfur may be a commercial grade.

The preferred composition of the first embodiment may have the approximate percentages of ingredients of Example 1 below.

EXAMPLE 1

| AC-5 asphalt | 47.0% |
| Operative process oil | 29.3% |
| SBR rubber | 23.4% |
| Sulfur | 0.3% |

In the process of manufacture, mixing of the ingredients may be carried out in a covered, circular mixing vat of the jacketed type having rotating stirrer blades. The sides of the vat, or a portion thereof, may be jacketed for the introduction of heating oil at a temperature of 400° F. or 200° C., or above. The asphalt is conveniently preheated to 350° F. or 177° C. and introduced through an inlet pipe, while a portion of the process oil, such as approximately one-half of the total weight of process oil, may be introduced through a second inlet pipe. Then, the SBR rubber, in compressed bale form, may be sliced off in thin layers, such as $\frac{3}{8}$ in. in thickness, and chopped by blades until it will pass through a screen having holes of $\frac{1}{4}$ in. to $\frac{3}{8}$ in. in size. The chopped or crumb SBR rubber is fed by increments into the vat, after which stirring of the mixture is continued and the temperature maintained at 275° to 300° F.

After a period of about one hour, as when the particles of SBR rubber appear to have diminished in size, the remaining half of the process oil may be added through the second inlet pipe, while the sulfur may also be added. Stirring is continued, as for another hour or more, while the temperature is maintained at 275° to 300° F., until the surface of the mixture, which will be moving as various portions come to the surface, is smooth, i.e. particles of undispersed synthetic rubber are no longer visible in the mixture.

After the mixture has achieved a smooth appearance, it is pumped from a bottom outlet of the vat to a jacketed storage tank, in which the mixture is maintained at less than 300° F., such as below the melting point of a polyethylene liner of the pails in which packed, so that it will not adhere to the pails. From the tank, the mixture may be packed in pails, such as having a 6 gallon capacity, or holding approximately 50 lbs. of the mixture and provided with a 1 or 2 mil. thick lining of plastic, such as polyethylene, to which the composition, after cooling and solidifying, has less tendency to adhere. Tops may be placed on the filled pails, which may be held until the mixture cools to room temperature, then placed in a warehouse for distribution.

Variations of the formula of Example 1 can also produce similar results. For example, a composition containing approximately 38% asphalt, 32% process oil, 30% SBR rubber and 0.3% sulfur had similar physical properties. Slightly lower amounts of SBR rubber and process oil may also be used.

A series of tests, in each of which the percentage of the SBR rubber exceeded the percentage of the process oil, resulted in low elongation values.

For application to joints, cracks and the like, as in concrete and asphalt of streets or highways and the like, as well as bridges or other structures, the composition after removal from the pail or other container, is placed preferably in a double boiler, oil jacketed melter which is equipped with a mechanical agitator and separate thermometers for measuring the temperature of both the oil bath and the composition in the melter. A preferred temperature to which the composition is heated is 400° F. or 240° C., while the preferred temperature at which the composition is poured is 390° F. or 234° C. Small quantities of the composition are added as it is removed during continuous agitation. It has been found that cracks or joints may be sealed at air temperatures of 40° F. and above.

In the application of the composition of this invention, the joints or cracks may be ground or routed out so that the finished configuration will have a depth which is at least one-half the width and cleaned by sandblasting or mechanical brushing, with all loose particles being blown out with compressed air prior to sealing. Although any composition left in the melter at the end of a day's operation may be permitted to solidify and be remelted the next day, all lines through which the composition is run should be cleaned out with a solvent, kerosene and fuel oil having been found suitable.

Reference is made to Table II for the ingredients of the second preferred embodiment. The preferred asphalt, process oil and SBR rubber of lesser molecular weight may be the same as utilized for the first embodiment. As indicated, the preferred SBR rubber of greater molecular weight is a butadiene-styrene copolymer which is apparently crosslinked to a greater extent than the 75/25 copolymer, but is available as a non-staining polymerized radial block of 70% butadiene and 30% styrene. It has a specific gravity of about 0.94 and a molecular weight of 300M. The limestone used may be commercial grade and is pulverized for addition to the mixture.

The ranges of percentages of the second embodiment are illustrated by Table II, while examples of this embodiment are set forth as Examples 2 through 7, inclusive, in percent by weight.

EXAMPLES 2-7

| Example | 2 | 3 | 4 | 5 | 6 | 7 |
|---|---|---|---|---|---|---|
| AC-5 Asphalt | 41.9 | 47.0 | 52.0 | 57.5 | 58.0 | 61.25 |
| Operative process oil | 24.0 | 22.0 | 23.0 | 20.0 | 25.0 | 18.0 |
| SBR Rubber (Higher Mol. Wt.) | 3.1 | 3.0 | 3.0 | 2.0 | 4.0 | 2.75 |
| SBR Rubber (Lower Mol. Wt.) | 11.0 | 8.0 | 17.0 | 15.5 | 13.0 | 8.0 |
| Limestone Filler | 20.0 | 20.0 | 5.0 | 5.0 | 0 | 10.0 |

It will be noted that, as in the case of the first embodiment, in each of the examples of the second embodiment, the percentage of asphalt exceeds the percentage of process oil and the percentage of process oil exceeds the percentage of SBR rubber. In addition, the amount of process oil is well below 32% by weight, while the amount of SBR rubber of lower molecular weight exceeds the amount of SBR rubber of higher molecular weight.

For each of the above Examples, the asphalt was preheated to a temperature between 350° and 375° F., or between 177° and 191° C., and placed in a covered, circular mixing vat having a jacket to which heating oil at 400° F. or 200° C. is supplied, to maintain the temperature of the mixture, as between 325° and 350° F. during the initial mixing. The higher molecular weight butadiene-styrene copolymer, such as having a ratio of 70% butadiene and 30% styrene copolymer, is comminuted, ground or pulverized as before and introduced in increments into the asphalt. The higher molecular weight SBR rubber requires a higher temperature than that of lower molecular weight to be dispersable in the mixture and can be mixed in the asphalt within a reasonable time, such as one hour.

After mixing and stirring for between one and two hours, when the mixture appears to be smooth, addition of the SBR rubber of lower molecular weight, in ground or crumb form and in increments, may be begun, accompanied by addition of 30% to 70% but preferably about one-half of the process oil, which reduces the temperature, as to 270° F. to 300° F., but is maintained while stirring is continued. Since the SBR rubber of greater molecular weight has had an opportunity to become solvated with time and temperature, aided by the shear due to the combination of mixing and viscosity, the SBR rubber of lesser molecular weight will solvate comparatively rapidly, thereby tending to further increase the viscosity. However, the process oil tends to permit sufficient viscosity to maintain an adequate shearing action, although the limestone appears to assist in the shearing effect of the stirring blades on the SBR rubber. After mixing for about one hour above 275° F. or 140° C., the balance of the process oil may be added, thereby reducing the viscosity which has gradually increased, followed by addition of the filler, which aids in reducing heat for packaging. Additional mixing, as for a minimum of two hours while the temperature is maintained at 275° F. to 300° F., is utilized until the mixture becomes smooth and uniform.

The compositions produced by the above examples were tested in accordance with the ASTM D 3407-75T test method covering joint sealing compositions. This method contains a bond test in which the material is extended 100% at 0° F., or 50% at −20° F. for three (3) complete cycles. Any development of a crack, separation, or opening at any point that is over ¼ inch deep, in the sealer, or at the interface with the mortar block, constitutes a failure during the test. On the above compositions, this test was conducted at −20° F., and the extension was increased to 100% (50% is required) for three (3) cycles. These were then examined, using the normal failure criteria stated above. Also included was a bond test in which a single extension of 300% at −20° F. was conducted. The preferred compositions will pass these much more rigorous bond tests while maintaining a resilience of 60%, or more, flow values below 0.3 cm., and penetration values in the 110–150 1/10 mm. range when tested at 77° F., and 35 1/10 mm. or over when tested at 0° F.

Table III contains the results of the above tests.

TABLE III

| | Tests of Compositions of Examples 2–7 | | | | | |
|---|---|---|---|---|---|---|
| Example | 2 | 3 | 4 | 5 | 6 | 7 |
| Penetration, 1/10 mm: | | | | | | |
| at 77° F. | 113 | 128 | 135 | 115 | 118 | 136 |
| at 0° F. | 36 | 36 | 50 | 41 | 48 | 42 |
| Flow cm. | 0.25 | 0.25 | 0.25 | 0.10 | 0.10 | 0.25 |
| Resilience, % | 66 | 65 | 64 | 69 | 78 | 60 |
| Bond Test: | | | | | | |
| 100% Extension at −20° F., 3 cycles | All pass | | | | | |
| 300% extension at −20° F., 1 cycle | All pass | | | | | |

To further examine the extension capabilities of these compositions, the bond test extensions were increased to 200% at −20° F. for three (3) cycles. All of the compositions also passed this test. These results exhibit the ability of this invention to far exceed the normal extension capabilities of joint sealing compositions.

A reference material meeting the normal specifications was tested in the same manner as the compositions in Table II. It did not pass the bond tests at the increased elongations.

In each of the preferred examples, paving asphalt, which conforms to ASTM D 3381, is the preferred asphalt, although tests indicate that other straight reduced or solvent extracted asphalts should give reasonably good results, but that roofing or other air blown asphalts would not. Thus, it will be understood that the term asphalt includes both straight reduced and solvent extracted asphalts. Also, the preferred operative process oil used is a naphthenic oil, which contains not only naphthenes, i.e. cyclic hydrocarbons, such as cyclopentane and cyclohexane with side chains of varying length, but also a portion of aliphatic hydrocarbons and aromatic hydrocarbons. Paraffinic and naphthenic process oils which also contain aromatic carbon atoms in a proportion less than paraffinic or naphthenic carbon atoms, should be usable, particularly those having a viscosity similar to that of SUS 200 referred to previously. It will thus be understood that a process oil, as used herein, need not be a naphthenic oil, although the failure of the compositions to pass the necessary tests when the highly aromatic FCC bottoms were substituted for the preferred process oil, indicates that the amount of aromatic compounds in a process oil can be undesirably high and that such a process oil should not be used. With respect to the SBR rubber, it will be understood that the same should be dispersable in asphalt, while a butadiene-styrene copolymer, as used herein, means a polymer in which the butadiene exceeds the styrene. It will further be understood that other materials, such as diatomaceous earth or fly ash, may be substituted for limestone.

The product of each of the embodiments, as well as other variations of this invention, have properties not possessed by prior art asphalt and rubber compositions, including those with the best low temperature properties. For instance, one of the best prior asphalt and rubber compositions will withstand, at −20° F. or −29° C., three cycles of expansion to 50% of its original width without rupture, whereas applicants' composition, in both the first and second embodiments and variations thereof, at −20° F. or −29° C., will withstand three cycles of expansion to 100% of its original width and will also withstand one cycle of expansion to 300% of its original width, each without rupture. Further-more, the compositions of the second embodiment, as indicated, successfully passed the test of extension to 200% for three (3) cycles at −20° F. or −29° C. The unexpected additional elongation at low temperatures indicates a low stress strain relationship, i.e. that the adherence of the composition to the sides of a joint or crack exceeds the stress required to stretch it. Thus, the compositions of this invention exhibit low temperature properties comparable to those of the best silicone rubber but at a cost many times less than that of this silicone rubber.

An unexpected property of a composition of this invention which has been observed is the tendency, when cool, to reject foreign objects, such as stones or gravel. Thus, an object pushed into the composition, when set, tends to be pushed out. This is a material advantage in reducing the possibility of an accumulation of stones or gravel in a joint, which later may resist expansion of the concrete at each side of the joint, with possible cracking of the concrete adjacent the joint.

A composition of this invention also has "non-tracking" properties, i.e. after solidification of the composition, the tires of vehicles have been found to have little tendency to pick up the composition and deposit it on the pavement adjacent the joint. This is of advantage in obviating loss of joint material during warm weather, when the pavement expands and the joint narrows to force the material upwardly and subject to possible loss by tracking, thereby producing a greater cavity when the pavement contracts during cold weather. This lack of tracking is apparently due to a lack of tackiness after cooling, resulting from the consistency and rubberiness, as it were, of the composition when cool.

It will be noted that the proportion of SBR rubber in the composition of this invention is less than the proportion of process oil, whereas in the best prior asphalt and rubber composition, the reverse is true. It will also be noted that compositions in which the proportion of asphalt was 40-50%, of process oil was 32-36%, SBR rubber of high molecular weight was 6-14% and limestone was 0-10%, exhibited a tendency to "bleed" or exude process oil, thereby adversely affecting the bond to the concrete, asphalt or the like to which adhered. Thus, it was found that the amount of process oil should not exceed 32%.

Although two preferred embodiments of the invention have been described, it will be understood that other embodiments may exist and that various changes may be made without departing from the spirit and scope of this invention.

What is claimed is:

1. A method of producing a composition capable of sealing cracks, joints and the like in concrete or asphalt, subject to summer temperatures and winter temperatures substantially below zero degrees F., comprising:

heating paving grade asphalt to a temperature above that at which, in a mixture of said asphalt and operative process oil, an SBR rubber is dispersable, said asphalt being sufficient in amount that said SBR rubber is dispersable in said mixture with the amount of asphalt being greater than the total amount of process oil, and the total amount of process oil being in excess of the SBR rubber, but not in excess of 32% by weight of the total ingredients, each by weight;

adding a sufficient amount of operative process oil to said asphalt that said SBR rubber, in particulate form, is dispersable in said mixture;

maintaining the temperature of said mixture at or above said temperature at which said SBR rubber is dispersable;

adding in increments particulate SBR rubber to said asphalt and process oil while heating and stirring said mixture;

adding the remainder of the process oil; and continuing heating and stirring the mixture until the mixture has a smooth appearance.

2. A composition produced by the method of claim 1, wherein:

a specimen of said composition will withstand, at −20° F. or −29° C., extension to 300% of its original width without rupture.

3. A method as defined in claim 1, wherein:

the temperature of each mixture is maintained at at least about 275° F.

4. A method as defined in claim 1, wherein:

the amount of asphalt is approximately 38% to 50%, the amount of operative process oil is approximately 29% to 32% and the amount of SBR rubber is approximately 23% to 30%.

5. A method as defined in claim 1, including:

packaging said composition and permitting it to cool and to solidify;

reheating said composition to a temperature of around 380° F. to 400° F.; and applying said reheated composition to a crack, joint and the like.

6. A method of producing a composition capable of sealing cracks, joints and the like in concrete or asphalt, subject to summer temperatures and winter temperatures substantially below zero degrees F., comprising:

heating paving grade asphalt to a temperature above that temperature at which a butadiene-styrene copolymer of greater molecular weight is dispersable, said asphalt being sufficient in amount that said butadiene-styrene copylmer of greater molecular weight, in particulate form, is dispersable therein with the amount of asphalt being greater than the total amount of process oil and the total amount of process oil being in excess of the total amount of butadiene-styrene copolymers but not in excess of 32% by weight of the total ingredients, each by weight;

adding in increments particulate butadiene-styrene copolymer of greater molecular weight to said asphalt while stirring and maintaining the temperature of said asphalt at or above said temperature at which said butadiene-styrene copolymer is dispersable;

adding a sufficient amount of operative process oil to said mixture, after said butadiene-styrene copolymer of greater molecular weight has been added in increments, that a butadiene-styrene copolymer of lesser molecular weight, in particulate form, is dispersable in said mixture;

adding particulate butadiene-styrene copolymer of lesser molecular weight in increments to the mixture while continuing stirring and maintaining the temperature of said mixture at or above a temperature at which said butadiene-styrene copolymer is dispersable;

adding the remainder of the process oil after the butadiene-styrene copolymer of lesser molecular weight has been added; and continuing heating and stirring the mixture until the mixture has a smooth appearance.

7. A method as defined in claim 6, including:
adding a filler to said mixture during the period of addition of the butadiene-styrene copolymer of lesser molecular weight.

8. A method as defined in claim 6, wherein:
said butadiene-styrene copolymer of lesser molecular weight has a ratio of butadiene to styrene of 75 to 25; and
said butadiene-styrene copolymer of greater molecular weight has a ratio of butadiene to styrene of 70 to 30.

9. A method as defined in claim 6, wherein:
said filler comprises limestone in an amount up to 20% of the total weight of the ingredients.

10. A method as defined in claim 6, wherein:
said mixture, during the addition of said butadiene-styrene copolymer of greater molecular weight, is maintained at a higher temperature than during the addition of said butadiene-styrene copolymer of lesser molecular weight.

11. A composition produced by the method of claim 6, wherein:
a specimen of said composition will withstand, at −20° F. or −29° C., extension to 300% of its original width without rupture.

12. A method as defined in claim 6, wherein:
said butadiene-styrene copolymer of greater molecular weight is added in particulate form and the mixture is stirred at a temperature of 325° F. to 350° F. until smooth;
said butadiene-styrene copolymer of lesser molecular weight is added in particulate form and approximately one-half of said process oil and a filler are added and the mixture is stirred at 275° F. to 300° F. for approximately one hour; and
the remainder of said process oil is added to the mixture and the resulting mixture maintained at 275° F. to 300° F. and stirred until smooth.

13. A method as defined in claim 6, wherein:
said ingredients include, by weight, approximately 41.9 to 61.25% asphalt, 18 to 25% process oil, 2 to 4% SBR rubber of greater molecular weight, 8 to 17% SBR rubber of lesser molecular weight and 0 to 20% of a limestone filler.

14. A composition capable of sealing cracks, joints and the like in concrete or asphalt, subject to summer temperatures and winter temperatures substantially below zero degrees F., comprising:
a mixture of paving grade asphalt, operative process oil, an SBR rubber of greater molecular weight dispersable in said asphalt and an SBR rubber of lower molecular weight dispersable in said asphalt, the proportion of said asphalt being greater by weight than said process oil, the proportion of said process oil by weight being greater than the total of said SBR rubbers but not more than 32% and the proportion of said SBR rubber of lesser molecular weight being greater than the proportion by weight of said SBR rubber of greater molecular weight.

15. A composition as defined in claim 14, wherein:
a specimen of said composition will withstand, at −20° F. or −29° C., extension to 300% of its original width without rupture.

16. A composition as defined in claim 14, wherein:
the ingredients of said mixture include approximately by weight 41.9 to 61.25% asphalt, 18 to 25% process oil, 2 to 4% SBR rubber of greater molecular weight, 8 to 17% SBR rubber of lesser molecular weight and 0 to 20% of a filler.

17. A composition as defined in claim 16, wherein:
said filler comprises limestone.

18. A composition as defined in claim 16, wherein:
said SBR rubber of greater molecular weight has a ratio of butadiene to styrene of about 75 to 25; and
said SBR rubber of lesser molecular weight has a ratio of butadiene to styrene of about 70 to 30.

19. A composition as defined in claim 16, wherein:
a specimen of said composition will withstand, at −20° F. or −29° C., extension for three cycles to 200% of its original width without rupture.

* * * * *